April 5, 1949.  B. DUPERTIUS  2,466,585
DEVICE FOR MAKING INDICIA FOR
WATCH DIALS OR THE LIKE
Filed Feb. 13, 1947  5 Sheets-Sheet 1

INVENTOR.
Bernard Dupertius
BY
ATTORNEY.

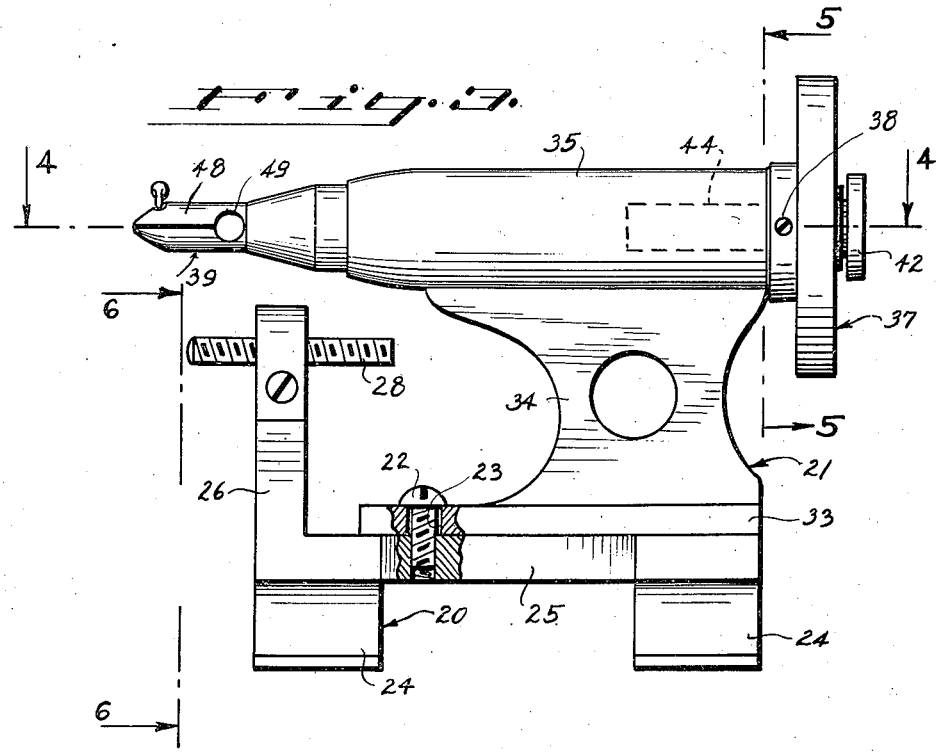
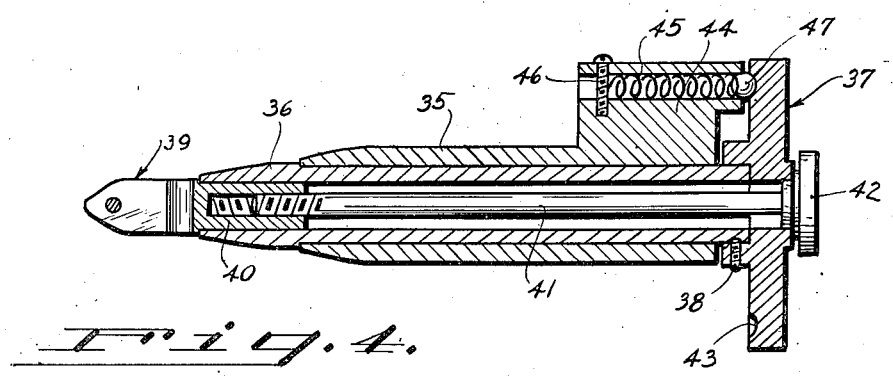

April 5, 1949. B. DUPERTIUS 2,466,585
DEVICE FOR MAKING INDICIA FOR
WATCH DIALS OR THE LIKE
Filed Feb. 13, 1947 5 Sheets-Sheet 3

INVENTOR.
Bernard Dupertius
BY
his ATTORNEY

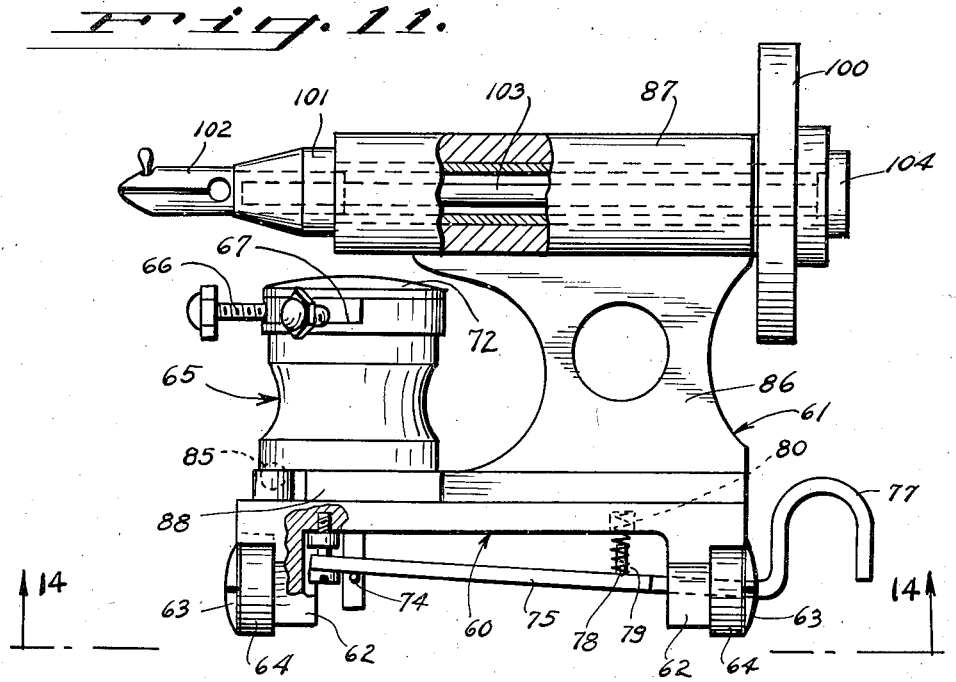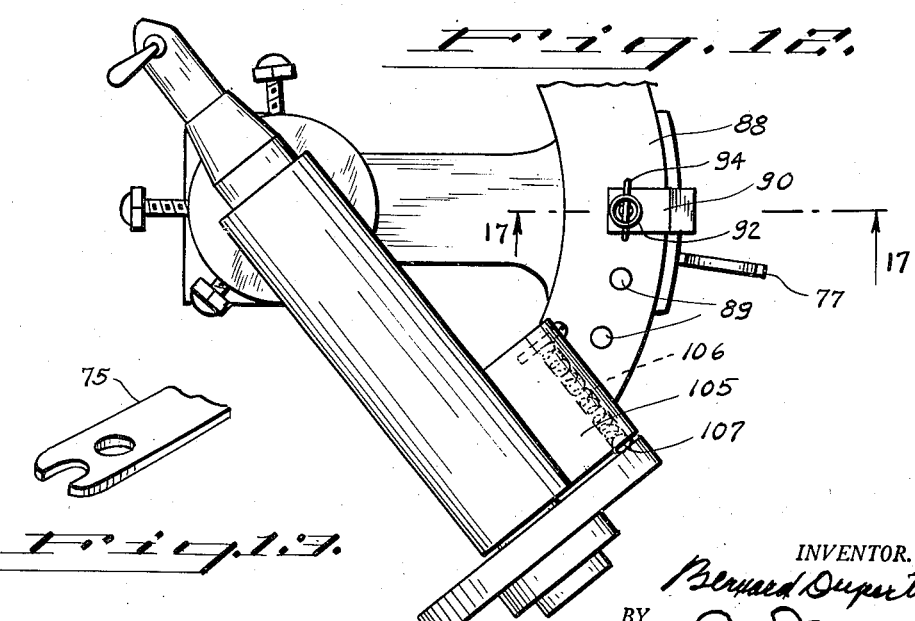

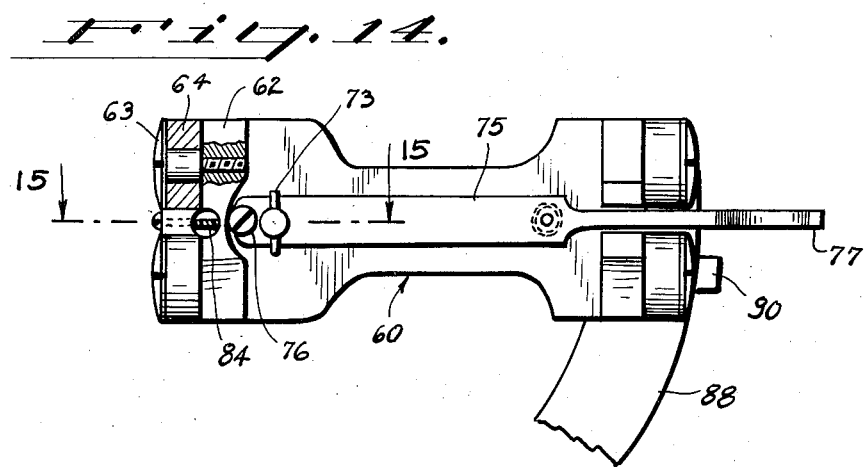
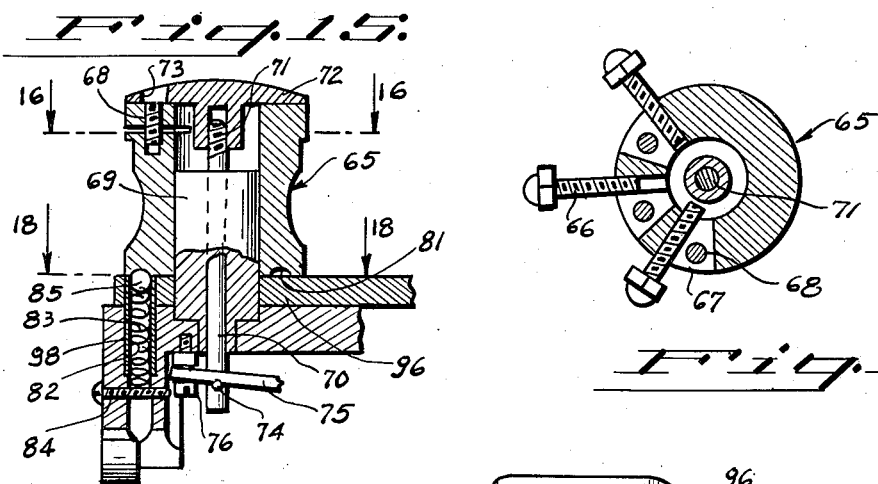
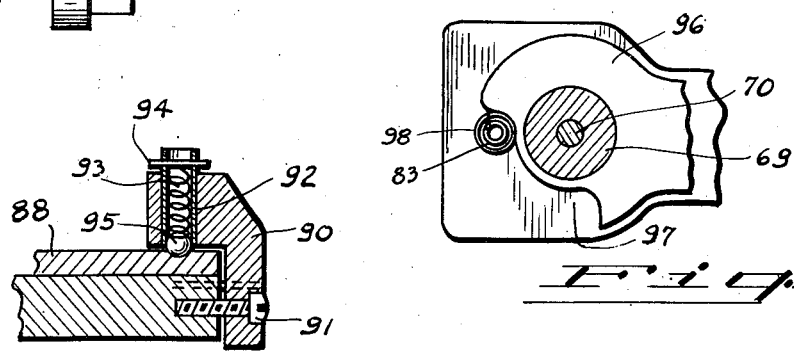
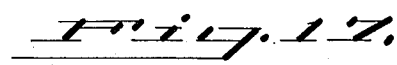

Patented Apr. 5, 1949

2,466,585

UNITED STATES PATENT OFFICE 2,466,585

DEVICE FOR MAKING INDICIA FOR WATCH DIALS OR THE LIKE

Bernard Dupertius, Rochelle Park, N. J., assignor to Du Bern Company, Inc., Passaic, N. J., a corporation of New Jersey Application February 13, 1947, Serial No. 728,304

1 Claim. (Cl. 51—125)

This invention relates to a device for manufacturing indicia for the dials of watches and the like.

It is known in the art that modern watch dials embody indicia, usually made of metal, such as gold, or a suitable other metal or alloy, which indicia are fanciful in shape and are designed for the double purpose of being decorative and at the same time of permitting ready reading of the dial at any position of the watch hands. To this end such indicia are preferably made in several different shapes, which can be distinguished from one another at a glance. This invention has for its general object to provide a simplified and highly efficient device for shaping such indicia, wherein the surfaces of said indicia exposed to the eye are limited by a plurality of adjacent plane surfaces, and are preferably given a high polish prior to being set in the dial.

A more specific object of this invention is to provide a device whereby such indicia may be shaped, that is, the limiting plane surfaces may be cut, and if desired polished, without the need of any adjustment of the device itself, and whereby the manufacture of such indicia may be accordingly speeded up and rendered simple and economical, not requiring any special skill on the operator's part.

Another object is to provide a device of the character described which embodies certain controls which are set according to the shape of the particular indicia to be manufactured but once set need not be changed or in any way acted upon until the shape of the indicia to be manufactured is changed.

A further object is to provide a device achieving any or all of the aforementioned objects which is particularly simple to make and to use, and is quite economical and foolproof.

Other related and ancillary objects of this invention will clearly appear as the description proceeds.

In the drawings:

Fig. 3 is a side view of one embodiment of a device according to this invention.

Fig. 4 is a horizontal cross section taken on the line 4—4 of Fig. 3 looking downwards.

Fig. 11 is a side view, with portions in section of another embodiment of my invention.

Fig. 12 is a top plan view of the device of Fig. 11.

Fig. 13 is a perspective view of a detail of said device.

Fig. 14 is a bottom plan view of said device.

Fig. 15 is a vertical section of a portion of said device, taken along the line 15—15 of Fig. 14 looking in the direction of the arrows.

Fig. 16 is a horizontal section taken on the line 16—16 of Fig. 15 looking downwards.

Fig. 17 is a vertical section of a detail of the device taken on the line 17—17 of Fig. 12 looking in the direction of the arrows.

Fig. 18 is a horizontal section taken on the line 18—18 of Fig. 15 looking downwards.

Figure 1:
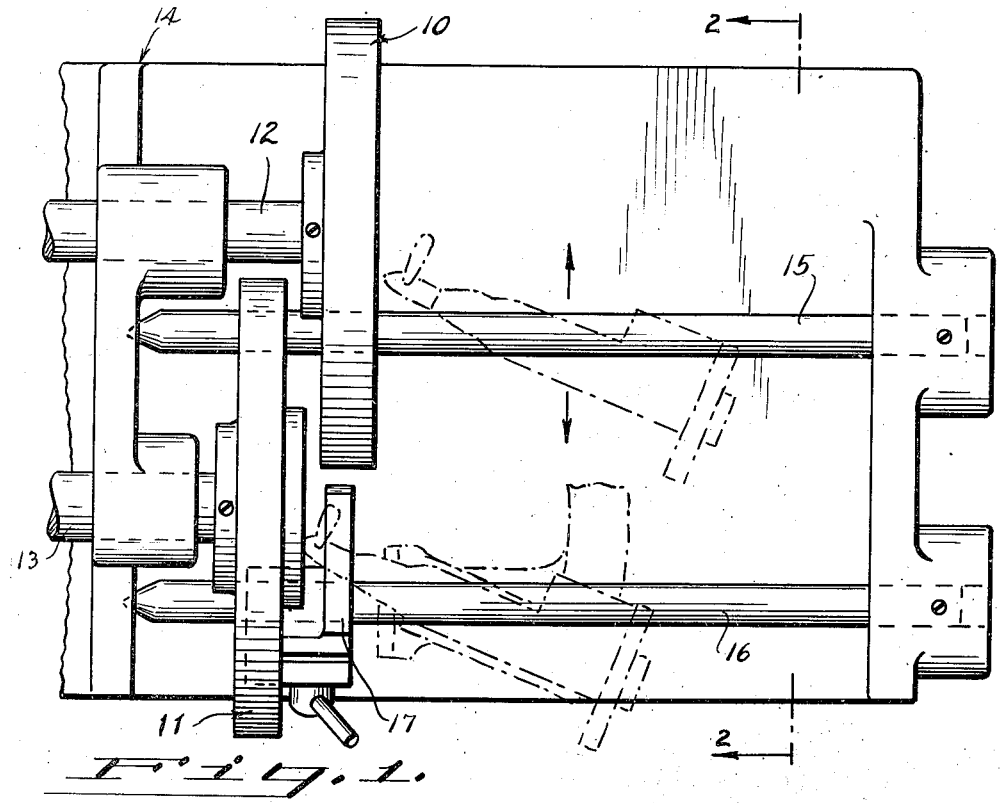
Fig. 1 is a plan view of a grinding and lapping mechanism, in connection with which a device according to this invention is adapted to be used, showing one preferred embodiment of the device itself in broken lines in two possible positions on the mechanism.

Referring now in detail to the drawings, a device according to this invention is used in connection with certain equipment, the parts of which more directly concerned are illustrated in Fig. 1. These parts comprise one or more grinding or lapping or polishing discs such as discs 10 and 11 mounted on shafts 12 and 13 respectively, journalled in a frame 14, power means for operating said discs (which power means are not shown or described inasmuch as they may be of a conventional type well known in the art), and a guide rod for each disc parallel to the shaft thereof and fixed to frame 14, such as guide rods 15 and 16. A stop plate 17 is fixed to frame 14 in front of wheel 11. A similar stop plate could be provided in front of wheel 10, but this is usually unnecessary.

Figure 9:
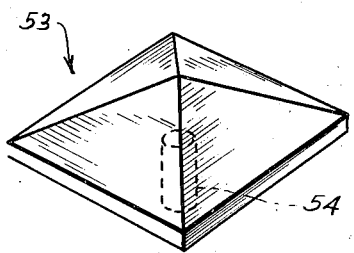
Fig. 9 is a perspective view.
Figure 10:
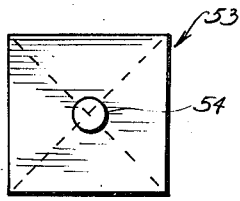
Fig. 10 is a bottom view of an indicia.

In the steps of manufacture of the indicia prior to the use of the device herein described and claimed, indicia blanks are manufactured having a substantially parallelepiped shape and further embodying one or two, or if desired even more nipples such as nipple 54 (Figs. 9 and 10) protruding from the bottom face of the blank, that is from the face opposite to that which would be cut and will be exposed to view in the dial. Such manufacture may be accomplished in a press by the use of suitable dies, and during the pressing operation the aforementioned nipples will be caused to be extruded from the body of the blank, an operation which presents no difficulty in view of the malleable character of the metal or alloy of which the indicia blanks are made.

Figure 2:
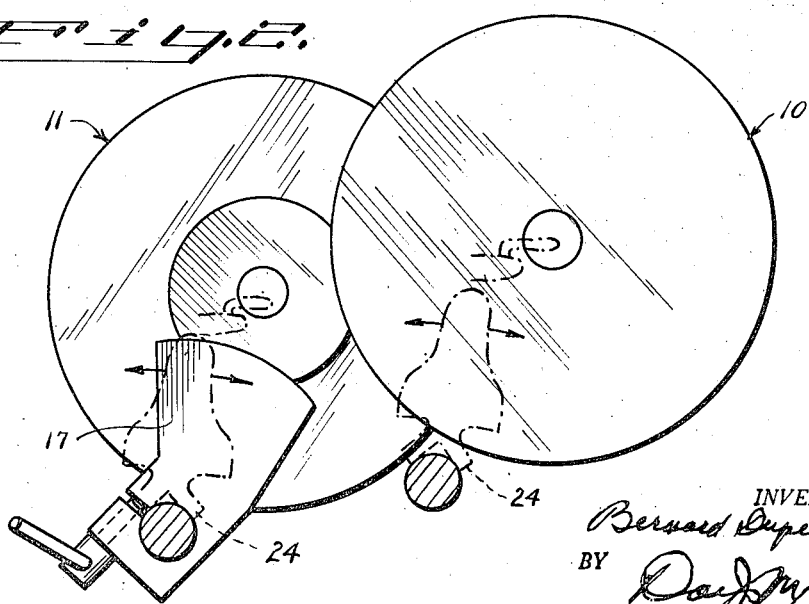
Fig. 2 is a section taken on line 2—2 of Fig. 1 looking in the direction of the arrows.
Figure 5:
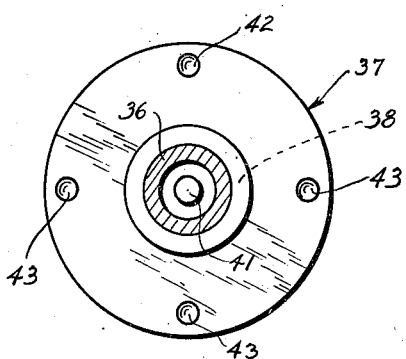
Fig. 5 is a vertical section taken on the line 5—5 of Fig. 3 looking in the direction of the arrows.
Figure 6:
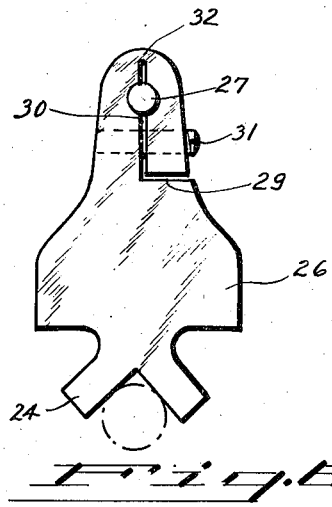
Fig. 6 is a front view of the lowermost portion of the device of Fig. 3.
Figure 7:
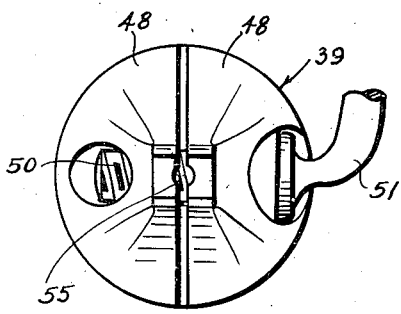
Fig. 7 is a front view.
Figure 8:
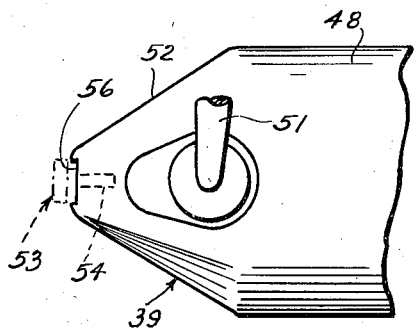
Fig. 8 is a side view of a detail of the device of Fig. 3, and particularly of the chuck.

One preferred embodiment of my device, illustrated in Figs. 3 to 8 inclusive, and indicated in phantom lines in Figs. 1 and 2, consists of two pieces 20 and 21, which will be respectively designated as bottom and top pieces, interconnected by means of a screw 22 which goes through a bore 23 in the top piece and threadedly engages the bottom piece. The bottom piece 20 comprises two downwardly depending yokes 24 adapted to seat on rods 15 and 16 of Fig. 1 to provide a sliding guide for the device lengthwise of said rods. The bottom piece furthermore comprises a plate 25 and a front bracket 26, which are all rigid together and with the yokes, so that the bottom piece can be made of a single metal casting, or in any other convenient manner. The front bracket 26, as best seen in Fig. 6, has therein a bore 27 provided with a female screw thread and adapted threadedly to receive an adjustable stop 28. To clamp the adjustable stop firmly in its bore, the bracket 26 is slotted along two intersecting lines at right angle, as shown at 29 and 30, and the slot 30 extending somewhat above the bore 27. A screw 31 is provided whereby the portion of the front bracket to the right and above the two branches of the L shape cut, as viewed in Fig. 6, can be clamped about the screw 28, by taking advantage of the resilient bending which can take place in the relatively thin portion 32 which alone connects said portion to the remainder of the bracket.

The top piece 21 comprises a plate 33 in superimposed and contacting relationship with the plate 25, a vertical web 34 and a horizontal cylinder 35, all of the above mentioned pieces being rigid together. Inside the cylinder 35 fits freely an assembly consisting of a sleeve 36, a disc 37 rigidly connected to 36 as by means of screw 38, a chuck 39, having a rear portion 40 solid therewith or rigidly attached thereto, a shank 41 the forwardly portion whereof screws into the portion 40 of the chuck, and the rearmost portion whereof carries a flange or disc 42 by means of which the shank 41 can be screwed or unscrewed into the chuck and shank and chuck may be clamped on to the sleeve 36 and disc 37 or removed therefrom. The disc 37 has on the forwardly face thereof depressions 43 preferably conical or so shaped as to accommodate a portion of a spherical member or ball. The number of such depressions and their distribution upon the surfaces of the disc will depend on the design of the particular indicia that are to be manufactured, and are therefore a matter of judicious choice. Solid with the cylinder 35 is a smaller cylinder 44, wherein is housed a compression spring 45 bearing at one end against a stop such as the screw 46 and at the other end urging a sphere or ball 47 into pressure engagement with the forwardly face of the disc 37. It is apparent from the foregoing that the disc 37 with the pieces rigid therewith is freely rotatable with respect to the body with the top piece until the ball 47 engages one of the depressions 43, whereupon it is clamped in position, but can be moved if sufficient force is exerted to compress the spring 45 and cause the ball 47 to withdraw from the depression which it has engaged.

The chuck 39, in the embodiment shown, consists of two jaws 48, which are produced preferably by cutting a cylindrical piece of metal along a longitudinal plane. Behind the jaws 48 the chuck is conveniently lightened, as by boring it through as at 49, to facilitate clamping of the jaws by elastic bending of the lightened portions of the chuck surrounding the bore 49. The clamping and unclamping are effected by means of a screw 50 actuated by a handle 51. The front portion of the chuck is cut away along inclined planes such as 52 to present to the grinding or lapping wheel a small portion perpendicular to the axis of the chuck, in which portion the indicia to be shaped is held. One such indicia is illustrated at 53. Depending on the exact shape and size of these indicia the precise shape of the chuck may be varied. For instance, with the indicia 53 illustrated, which is provided with one nipple 54, the chuck is provided with a central longitudinal bore 55 wherein said nipple will seat, and furthermore the forwardmost portion of the chuck is recessed as indicated at 56 to provide a substantially square depression in which the indicia 53 will fit and will be securely held without turning during shaping thereof. Of course said indicia blank prior to shaping, that is when it is first clamped into the chuck, does not present the pyramidal surfaces seen in Fig. 9, but has a parallelepiped blank configuration indicated in broken lines in Fig. 8. When indicia blanks of a more elongated shape are worked in the device, said indicia blanks may be provided with two nipples, and it will be unnecessary to recess the forwardmost portion of the chuck, because the two nipples themselves will prevent turning of the indicia during operation. Likewise the shape of the surfaces 52 will vary with that of the indicia, to be shaped in the chuck.

The application of the device hereinbefore described is as follows. Once an indicia blank has been clamped into the chuck, and the top and bottom piece have been clamped together by means of screw 22 at the desired angle, which angle depends on the particular shape of the indicia to be made, the device is seated with its yokes 24 on the rod 16 of Fig. 1. It is then manually advanced until the forward end of the adjustable stop 28 bears against the stop plate 17. Needless to say, the adjustable stop has been screwed in or out to the proper position corresponding to the particular indicia that is to be manufactured and to the chuck that is in use. If then the device is manually pressed to the left, as viewed in Fig. 1 and moved against the grinding or lapping wheel 17, one plane face of the indicia will be cut. The disc 37 is then manually turned overcoming the spring 45 and causing the ball 47 to roll against the disc 37 until said ball 47 engages another depression 43, and a second face of the indicia is cut, and the operation is repeated for each face to be cut and therefore usually for each depression 43. It is seen that all of said faces have one characteristic in common: their angle with respect to the axis of the chuck is complementary to the angle which the axis of the chuck makes with the axis of the yokes 24, which latter angle can be called for short, the angle between top and bottom pieces. Hence with this arrangement, once the screw 22 has been tightened, only such indicia can be cut as are limited by faces which are at the same angle with the axis of the indicia. In a preferred mode of operation, to which Fig. 1 refers, after the faces of the indicia have been cut in the manner above described, they are polished on wheel 10 by seating the device on rod 15 and urging it against the wheel 10. In view of the nature of the polishing operation, it is usually considered unnecessary to have a stop plate provided herein, although such plate could be added if desired.

A second preferred embodiment of my invention, which is used in the same manner described for the foregoing embodiment, provides means for shaping indicia having faces which form different angles with the axis of the indicia, and therefore with the grinding or lapping wheels. Figs. 11 to 18 inclusive show such an embodiment. It comprises a bottom piece 60 analgous to the piece 20 and a top piece 61 analagous to the piece 21. The bottom piece 60 is also provided with yokes 62 on which, as illustrated in the drawings, there are freely mounted by means of screws 63 roller bearings 64. In place of the front bracket 26 of the first embodiment, there is however provided a separate stop drum 65, which carries a number (in the embodiment illustrated, 3) of stops 66, herein disclosed as screws. These screws engage corresponding threaded bores in the stop drum 65, which latter is slotted as indicated at 67 in Fig. 11 to provide an elastic clamping action about the stop screws 66 which is analagous to that explained in the case of the first embodiment with respect to the slots 29 and 30. Screws 68 (Fig. 15) are provided to realize said clamping action. The stop drum 65 is freely pivotable about a core 69 which also engages a bore in a portion 96 of the top piece 61, and serves as pivot for said top piece. The core is bored centrally to allow passage of a shank 70 which is screw threaded at the upper end thereof at 71. The screw thread 71 engages a threaded bore in a cap 72 which bears on the top of the stop drum 65 and is preferably provided with bores such as 73 whereby the screws 68 are rendered accessible from the top. The shank 70 has near its lower end a pin 74 which is engaged by a lever 75. Lever 75 has at one end, to the front of the pin 74, a bore through which passes a screw 76 which engages the body of the bottom piece 60. The lever 75 extends along the bottom of the device towards the rear and has a rearmost U-shaped finger piece 77 accessible to the operator from the rear of the device. At an intermediate portion thereof the lever 75 has an upwardly extending pin 78 surrounded by a compression coil spring 79 the upper ends whereof fit into a bore 80 in the bottom piece 60. The stop drum 65 has depressions 81 in the lower face thereof, which depressions match, and in the embodiment illustrated directly underlie, the stops 66. In the forward yoke portion of the bottom piece there is a vertical bore 82 in which is rigidly fitted an upwardly extending sleeve 98 which houses a compression coil spring 83 retained within the sleeve by a screw 84 or other equivalent means, and having superimposed thereto a ball or sphere 85 of a diameter corresponding to the size of the depressions 81. Normally the spring 79 urges the lever 75 to pivot downwards about its pivot screw 76, forcing the pin 74 and the shank 70 as far down as they will go. The shank 70 in turn draws with it the cap 72, and this latter holds the stop drum 65 into pressure engagement with the ball 85. As a result of this action, whenever the drum is in such position that the ball 85 engages one of the depressions 81, said ball 85 under the action of the spring 83 provides a resilient lock for the stop drum. For each position of the stop drum 65 corresponding to one of the depressions 81, one of the stops 66 is effective in the same manner as the stop 28 in the case of the first embodiment hereinbefore described. When it is desired to rotate the stop drum to render a different stop effective, it is sufficient for the operator to insert his finger underneath the U piece 77 and pull the lever 75 up, compressing the spring 79. Then the pin 74, the shank 70, and the cap 72 will no longer be urged downwardly, and therefore the resilient lock provided by the spring 83 and ball 85 and depressions 81 will be sufficiently loosened to provide easy manual rotation of the stop drum 65.

The top piece 61 comprises a vertical web 86, a horizontal cylinder 87, and a horizontal sector 88. Said sector 88 has on the upper face thereof a number of depressions 89 shaped substantially like portions of a sphere. A bracket piece 90, best seen in Fig. 17, is attached, as by means of screw 91 to the bottom piece, and has in the upwardly extending portion thereof a bore in which is force fitted or otherwise rigidly held, a sleeve 92. A compression coil spring 93 is housed in the sleeve 92 and is held therein by a pin 94 or other suitable means, and acts to force a ball or sphere 95 into pressure engagement with the upper surface of the sector 88. The last described spring and ball together with the depressions 89 in the sector 88 form a resilient lock of the nature of those already hereinbefore described, which lock is effective in a number of positions, each corresponding to one of the depressions 89. The upper piece 61 also embodies a forwardmost circular portion 96 best seen in Fig. 18, which portion 96 is centrally bored and is freely pivoted on the core 69, so that the whole top piece is freely pivotable thereabout with respect to the bottom piece 60. The portion 96 has a cut-away part 97, which cut-away part accommodates the sleeve 98 housing the spring 83 in all possible positions of the top piece relative to the bottom piece. The remaining parts of this embodiment do not substantially differ from those in the previously described embodiment. Here we have a disc 100, a sleeve 101, a chuck 102, a shank 103, a flange 104, a cyilnder 105, a spring 106, a ball 107, and a number of depressions in the disc 100 cooperating with the ball 107, which parts correspond respectively to, and perform the same functions as, the following parts of the first embodiment: disc 37, sleeve 36, chuck 39, shank 41, flange 42, cylinder 44, spring 45, and ball 47.

The operation of this second embodiment of my invention differs from the operation of the first embodiment in that, while the indicia is being shaped, the angle of the axis of the bit with respect to the grinding, lapping, or polishing wheel (and therefore the angle of the face of the indicia with respect to the axis of the indicia) can be varied by manually rotating the top piece about the core 69 to cause any desired depression 89 to come into engagement with the ball 95, as well as by pulling upwards the lever 75 and rotating the stop drum 65 to place any desired stop 66 in position to cooperate with a stop plate 17.

While I have described two preferred embodiments of my invention, by way of illustration, it is understood that a number of modifications, changes, and adaptations in the particular mechanical parts and arrangements and parts thereof can be made by persons skilled in the art, without departing from the spirit of the invention or exceeding the scope of the claim appended hereto.

I claim:

A device for shaping indicia for dials of watches or the like to be used in combination with a number of grinding and lapping wheels or the like, a number of fixed guides, and at least one fixed stop plate, comprising a bottom piece provided with seats engageable with said guides to guide said bottom piece along said guides in parallel relationship thereto, a stop support pivotable with respect to said bottom piece, a number of stop members removably and adjustably mounted in said stop support for engaging said stop plate to limit the displacement of said bottom piece towards said wheels, a cap member engaging said stop support, a lever member swingable with respect to said bottom piece, means for operatively connecting said lever member to said cap member, resilient means engaging said lever member normally to maintain the same in a position wherein it causes said cap to engage said stop support and press the same towards said bottom piece, a spring member mounted in said bottom piece, a ball freely mounted in said bottom piece between said spring and a face of said stop support, a number of depressions in said face of said stop support adapted to be engaged by said ball, said stop support becoming resiliently locked with respect to said bottom piece by the combined action of said spring member and of the above mentioned resilient means when one of said depressions is engaged by said ball, each of the positions in which said stop member thus becomes resiliently locked corresponding to one of said stop members and rendering said stop member operative, manually actuated means for overcoming said resilient means to loosen said resilient lock whereby to allow manual rotation of said stop support with respect to said bottom piece for rendering any desired stop member operative, a top piece pivotable with respect to said bottom piece, a member fixed to said bottom piece and housing a spring member, a ball interposed between said spring member and a face of said top piece, a number of depressions in said face of the top piece adapted to be engaged by said ball resiliently to lock said top piece with respect to said bottom piece in any one of a number of predetermined angular relationships corresponding each to a predetermined angle between a face of the finished indicia and the axis of symmetry of said indicia, a chuck for holding an indicia blank to be shaped, means for rotatably mounting said chuck in said top piece, and means for resiliently clamping said chuck with respect to said top piece in any one of a number of predetermined angular relationships.

BERNARD DUPERTIUS.

REFERENCES CITED

The following references are of record in the file of this patent:

UNITED STATES PATENTS

| Number | Name | Date |
|---|---|---|
| 457,866 | Messaz | Aug. 18, 1891 |
| 569,252 | Strasburger | Oct. 13, 1896 |
| 802,368 | Coleman | Oct. 24, 1905 |
| 1,094,914 | Loesser | Apr. 28, 1914 |
| 1,284,109 | Hunt | Nov. 5, 1918 |
| 1,305,038 | De Vries et al. | May 27, 1919 |
| 1,329,371 | Coleman | Feb. 3, 1920 |
| 1,583,963 | Donaldson | May 11, 1926 |
| 2,137,405 | Johns | Nov. 22, 1928 |
| 2,252,287 | Helfgott | Aug. 12, 1941 |
| 2,391,979 | Kershaw | Jan. 1, 1946 |